2,600,021

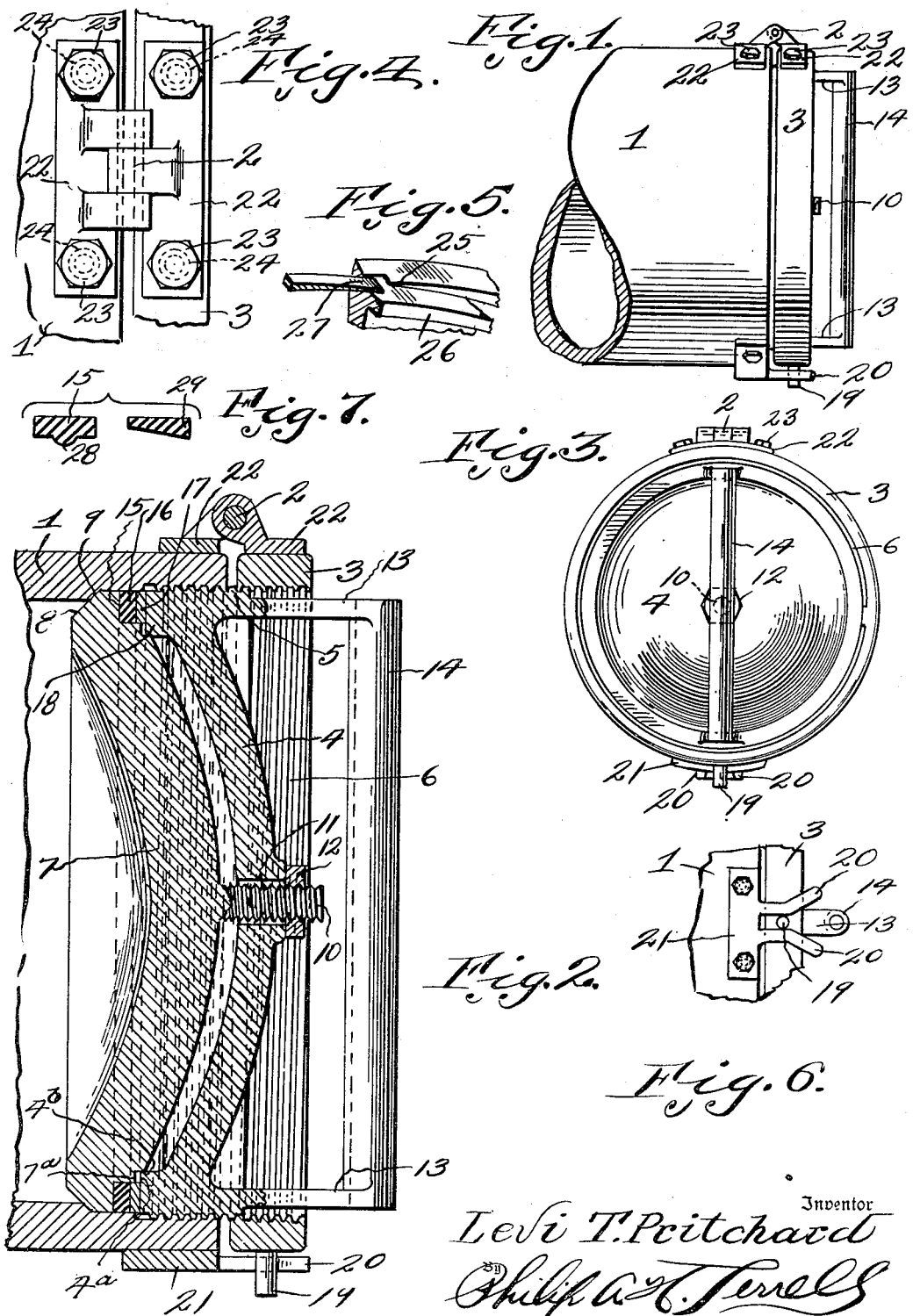
June 10, 1952 — L. T. PRITCHARD — 2,600,021
COVER FOR PRESSURE VESSELS
Filed Oct. 21, 1947
Inventor
Levi T. Pritchard
Attorney Patented June 10, 1952

UNITED STATES PATENT OFFICE 2,600,021

COVER FOR PRESSURE VESSELS

Levi T. Pritchard, Tulsa, Okla., assignor to Dry Ice Converter Corporation, a corporation of Delaware Application October 21, 1947, Serial No. 781,039

2 Claims. (Cl. 220—30.5)

The invention relates to covers for pressure vessels, and particularly for liquefiers used in connection with soda water fountains, and the like, which are serviced, from time to time, with solid carbon dioxide which liquefies or gasefies and is utilized during a soda water dispensing operation.

A further object is to provide a liquefier cover wherein the compression plate is carried by a threaded carrier plate, threaded into the liquefier opening, for compressing and expanding a gasket between the compression plate and carrier plate, and to mount the carrier plate in a hinged carrier ring into which the carrier plate is unscrewed so the carrier ring will swing horizontally on its hinging point to open or closed position.

A further object is to proportion the carrier plate and its threaded periphery whereby it will not entirely thread out of the carrier ring when tightened against the gasket interposed between the compression plate and the carrier plate.

A further object is to provide the carrier ring and the liquefier body with cooperating centering means for maintaining the axis of the body carrier plate and ring in perfect alinement when the closure is moved to closed position for a sealing operation.

A further object is to provide adjusting means in connection with the closure hinge so that the carrier ring can be adjusted closer to the liquefier opening, or further away or circumferentially so the end of the thread on the carrier plate will be in proper position for threading into the end of the thead at the outer end of the liquefier opening.

A further object is to confine the gasket in a gasket groove in a manner whereby it will positively expand outwardly, and not squeeze around the corner of the gasket groove.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of one end of a horizontal liquefier showing the closure applied thereto.

Figure 2 is a horizontal sectional view through the liquefier end and closure.

Figure 3 is an end view of the closure and liquefier.

Figure 4 is a plan view of the hinge.

Figure 5 is a perspective view showing some of the liquefier thread and the end of the thread on the carrier plate in proper position to thread into the liquefier opening.

Figure 6 is a plan view of the carrier ring centering device.

Figure 7 is a collective view of different shaped gaskets which will squeeze outwardly.

Referring to the drawing, the numeral 1 designates the liquefier body, which, for purposes of illustration, is shown in a horizontal position, however, it is to be understood that the closure may be used in connection with a vertical or inclined type if desired.

The body 1 is formed from heavy stainless steel, and designed to stand high pressures, which at times are as high as twelve to fifteen hundred pounds per square inch, and it is obvious, to prevent escape of gas under such high pressure, a closure must be provided which is not only heavy, but constructed in a manner whereby a seal substantially perfect is obtained.

Hingedly connected at 2 to one side of the body 1 is an interiorly threaded carrier ring 3, into which is threaded the dome shaped carrier plate 4. Carrier plate 4 is of sufficient width whereby its threads 5 will always be interengaged with some of the thread 6 of the carrier ring 3, especially when in closed position, as shown in Figure 2. The carrier plate 4 has mounted thereon a dome shape compression plate 7, having a bevelled edge 8, engaging the circumferential shoulder 9 within the body 1. The outer side of the compression plate is provided with a threaded stud 10, extending through an aperture 11 in the carrier plate, and has threaded thereon a nut 12. Extending outwardly from the outer side of the carrier plate are arms 13 of a cross handle 14, preferably hollow, so a bar may be inserted for assisting in unscrewing the carrier plate from its sealing position, as shown in Figure 2. The compression plate is provided with a circumferential gasket channel 15, in which channel an expansible gasket 16 is disposed. It will be noted that the gasket 16 is narrower than the channel 15 so the gasket can not squeeze around the corners of the retaining ring 17, which retaining ring is interposed between the gasket and the annular flange 18 of the carrier plate.

When it is desired to open the liquefier from the closed position shown in Figure 2, the nut 12 is loosened and the carrier plate is threaded outwardly into the hinged carrier ring. By loosening the nut, it will be noted that the outward movement of the carrier plate on its initial movement will relieve the expansive pressure on the gasket 16 so that, upon further outward movement of the carrier plate 4, the compression plate will easily follow. Ring 17, which is metal, facilitates the easy rotation of the carrier plate, after the carrier plate has been threaded outwardly a sufficient distance so that the compression plate will clear the open end of the liquefier, the entire closure is swung to open position on the hinging point 2. It will be noted during this entire operation that the treaded interengagement between the carrier plate and carrier ring is maintained at all times.

After the liquefier has been recharged with solid carbon dioxide the closure is swung to closed position, and to insure the alinement of the axis of the liquefier body, carrier plate and carrier ring, one side of the carrier ring is provided with a centering pin 19, which is guided to a centering position by the diverging fingers 20 of a bracket 21 carried by one side of the body. After the closure has been moved to closed position, the operator grasps the handle member 14, rotates the carrier plate along with the compression plate 7 until it threads into the open end of the body 1, and this rotation continues until the compression plate engages the shoulder 9, and the gasket 16 is compressed and outwardly expanded into sealing engagement with the inner periphery of the body 1, and this sealing engagement is further insured by the tightening of the nut 12.

The hinge leaves 22 are secured by means of bolts 23, which bolts extend through enlarged apertures 24 in the leaves and into the body 1 and carrier ring 3, therefore it will be seen there is a slight adjustment possible, circumferentially and outwardly of the carrier ring 3, so that the end 25 of the threads 26 in the mouth of the body member 1, and the end 27 of the thread 5 can be adjusted for proper registry when the carrier plate 4 is threaded into the body 1.

In Figure 7 the gasket 15 is provided with an annular bead 28 for facilitating its outward expansion, and with a thickened side 29 for facilitating expansion.

From the above it will be seen that a liquefier cover is provided which is simple in construction, positive in its operation, and one wherein the parts are carried by a constantly maintained threaded engagement with a hinged carrier ring.

It has been found desirable to prevent extreme compression of the gasket 16, and the mount of pressure applied thereon by the expansible action of the gas against the compression plate and the screw action of the carrier plate. To accomplish this result, the compression plate, on its outer side, is provided with an annular shoulder 7a in the path of the shoulder 4a of the carrier plate. It will also be seen that the carrier plate shoulder 4b extends into the annular channel 7a, consequently the compression plate is held in axial relation during the inserting and removing of the cover, and the carrier member when threaded inwardly or outwardly. By this arrangement, the life of the gasket is increased.

The threads 6 of the carrier ring 3 are slightly over size in relation to the threads on the carrier member 4, thereby allowing slight transverse adjustment or movement, so the compression plate and carrier can adjust themselves in relation to the axis of the receptacle 1.

The invention having been set forth what is claimed as new and useful is:

1. The combination with the open end of a pressure vessel, of a closure for said open end, said closure comprising a hinged carrier ring carried by the vessel in reigstry with said open end, a carrier plate threaded for axial movement through the carrier ring, a pressure plate carried by the carrier plate, expansible sealing means between said plates and adapted to be expanded when the carrier plate is threaded inwardly into the pressure vessel, said carrier plate maintaining its threaded engagement with the carrier ring at all times the thread on the carrier ring being slightly over size in relation to the thread on the carrier plate.

2. A device as set forth in claim 1 including interengaging flange and channel connection between the compression plate and the carrier plate, and forming means whereby said compression plate and carrier member are maintained in axial relation at all times.

LEVI T. PRITCHARD.

REFERENCES CITED

The following references are of record in the file of this patent:

UNITED STATES PATENTS

| Number | Name | Date |
|---|---|---|
| 1,226,766 | Gammater | May 22, 1917 |
| 1,961,298 | Lundy | June 5, 1934 |
| 2,015,761 | Muro | Oct. 1, 1935 |
| 2,202,927 | Schumaker | June 4, 1940 |
| 2,258,804 | Pfleumer | Oct. 14, 1941 |
| 2,435,913 | Wall | Feb. 10, 1948 |